(12) United States Patent
Ogawa

(10) Patent No.: US 7,847,506 B2
(45) Date of Patent: Dec. 7, 2010

(54) MACHINE TOOL CONTROLLER

(75) Inventor: Tetsuo Ogawa, Yamatokoriyama (JP)

(73) Assignee: Mori Seiki Co., Ltd., Yamatokoriyama-shi (JP)

( * ) Notice: Subject to any disclaimer, the term of this patent is extended or adjusted under 35 U.S.C. 154(b) by 763 days.

(21) Appl. No.: 11/773,441

(22) Filed: Jul. 5, 2007

(65) Prior Publication Data
US 2008/0018287 A1    Jan. 24, 2008

(30) Foreign Application Priority Data
Jul. 5, 2006    (JP)    ............................. 2006-185412

(51) Int. Cl.
G05B 19/23    (2006.01)
(52) U.S. Cl. ...................... 318/574; 318/560; 318/567; 318/569; 318/570; 318/638; 318/652
(58) Field of Classification Search ................. 318/574, 318/560, 567, 569, 570, 638, 652
See application file for complete search history.

(56) References Cited

U.S. PATENT DOCUMENTS

| | | | | |
|---|---|---|---|---|
| 3,783,253 A | * | 1/1974 | Anderson et al. | 318/568.1 |
| 5,352,964 A | * | 10/1994 | Nakamura et al. | 318/772 |
| 5,825,654 A | * | 10/1998 | Speth et al. | 700/188 |
| 5,920,170 A | * | 7/1999 | Seki et al. | 318/568.15 |
| 6,107,768 A | * | 8/2000 | Ouchi et al. | 318/568.1 |
| 6,903,528 B2 | * | 6/2005 | Komiya | 318/611 |
| 6,922,607 B2 | * | 7/2005 | Yamazaki et al. | 700/188 |
| 2001/0021880 A1 | * | 9/2001 | Kato et al. | 700/160 |
| 2005/0119784 A1 | * | 6/2005 | Suzuki et al. | 700/188 |

* cited by examiner

Primary Examiner—Walter Benson
Assistant Examiner—Kawing Chan
(74) Attorney, Agent, or Firm—Westerman, Hattori, Daniels & Adrian, LLP

(57) ABSTRACT

In a machine tool controller (1): a position control unit (12) controls, based on an operational signal input from without during manual operation, a moving body's move-to point and moving speed; a memory (13) stores data modeling the moving body and any potentially interfering machine-tool structure; a travel-area checking unit (17) defines in the modeled structure speed-control regions obtained by displacing the structure's contour, generates, based on the defined speed control regions and on current moving-body position, data modeling the moving body as moved into its current position, to check whether the moving body will travel within a speed control region, and if so, sends to the position control unit a speed limit predefined for that speed control region. The position control unit controls the moving body to travel at speed limit if the operational-signal-directed moving speed exceeds the speed limit.

8 Claims, 10 Drawing Sheets

Fig. 3

| Spindle | | Group 1 | Interference relationship |
|---|---|---|---|
| Chuck | | Group 1 | Interference relationship |
| Workpiece | | Group 1 | Cutting relationship |
| First saddle | | Group 2 | Interference relationship |
| Second saddle | | Group 2 | Interference relationship |
| Tool rest | | Group 2 | Interference relationship |
| Tool | Tool body | Group 2 | Interference relationship |
| | Tip | Group 2 | Cutting relationship |

Fig. 4

| Speed control region | Speed limit (mm/min) |
|---|---|
| First speed-control region A | 12500 |
| Second speed-control region B | 5000 |
| Third speed-control region C | 1000 |

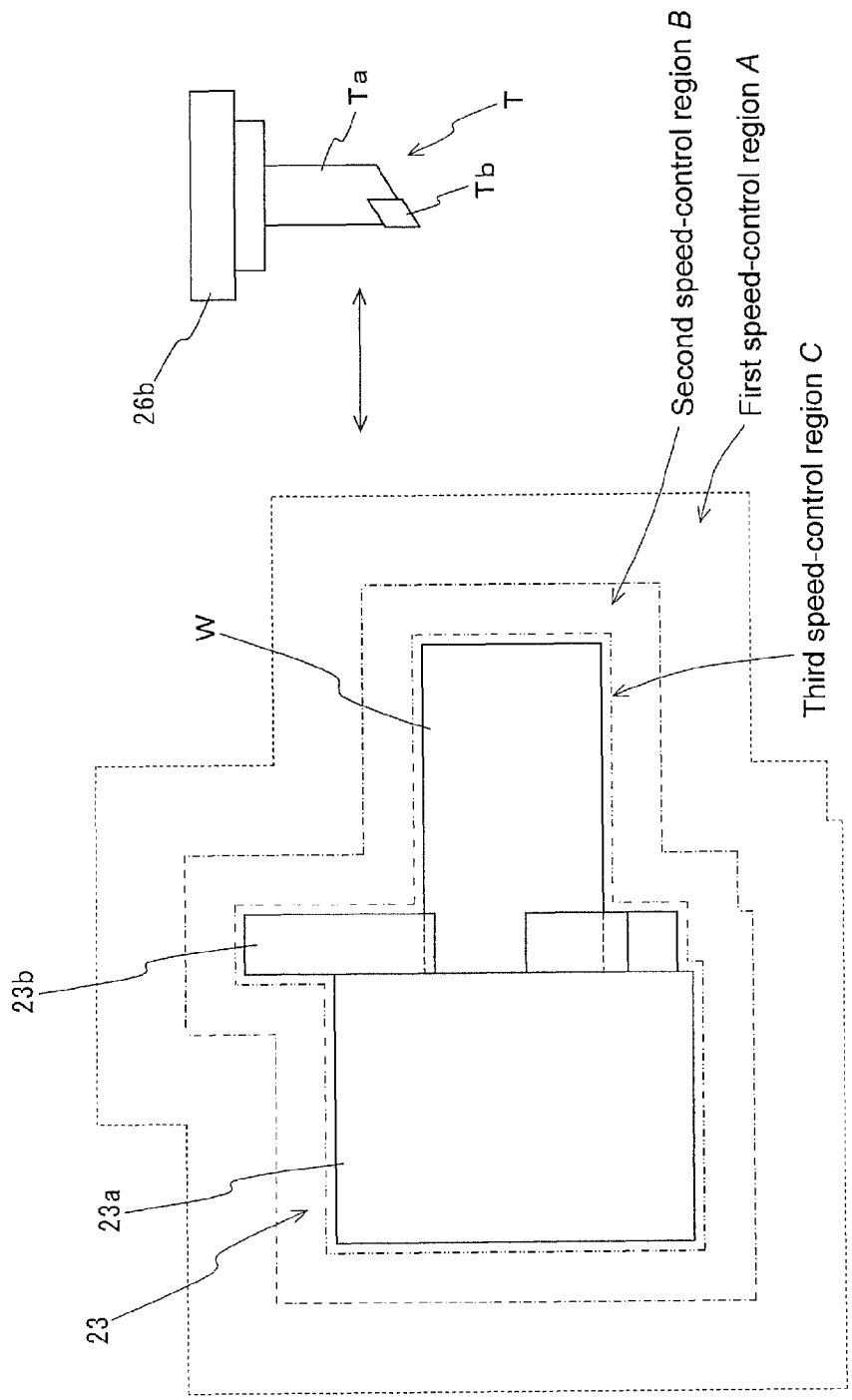

MACHINE TOOL CONTROLLER

BACKGROUND OF THE INVENTION

1. Technical Field

In machine tools furnished with a moving body, a drive mechanism for driving the moving body so as to move it, and a structure placed in the region in which the moving body can travel, the present invention relates to machine tool controllers that control actuation of the drive mechanism.

2. Description of the Related Art

The moving body and the structure placed in the region where moving body travels are at risk of interfering with each other. Machine tool controllers to prevent such interference have been known to date; such devices include the machine tool numerical control device disclosed in Japanese Unexamined Pat. App. Pub. 2006-59187.

This numerical control device, which is configured to prevent interference between the moving body and the structure while the moving body is moved by means of a manual operation, is made up of: a function generating means that receives an operational signal, which concerns the manual operation and is input from a control panel, to generate functions for executing control of the moving body's travel; a three-dimensional data memory for storing geometry data on the moving body and on the structure could interfere with the moving body; and a interference-checking device that checks by moving the moving body whether or not it will interfere with the structure, based on the moving body's and the structure's geometry data stored in the three-dimensional data memory, before the function generator receives the operational signal concerning the manual operation to start generating a function, and when determining that interference would occur, calculates a stop position at a certain distance from the structure. When the interference-checking device determines that the moving body would interfere with the structure, the function generator discontinues function generation so that the moving body will stop at the stop position.

According to this numerical control device, the moving-body and structure geometry data is employed to check whether interference would occur, before generation of a function for moving the moving body is started, so that interference between the moving body and the structure is efficaciously prevented.

In actual practice with machine tools in situations in which an operator moves the moving body to a predetermined move-to point by a manual operation, the moving body is not moved at a high speed all the way to the move-to point, but usually is moved at a high speed to the vicinity of, and then at a gradually decreasing speed into, the move-to point, even if the machine tool is equipped with in interference prevention function. That is, the operator moves the moving body to the predetermined move-to point while controlling feedrate override, depending on the move-to point of the moving body, to adjust the moving speed of the moving body.

Moving the moving body along with controlling the feedrate override to adjust the moving speed, however, complicates work operations. Additionally, an operator, bearing in mind that the interference prevention function is for preventing interference, will be concerned that interference may occur, and may make the operational error of moving the moving body at a high speed near the structure.

Moreover, with one of the examples of an interference prevention function that has been proposed, based on the moving body actual position sent from the controller and on an interference region predetermined, as appropriate, as the region in which the moving body and the structure would interfere with each other, a check is made as to whether or not the moving body enters the interference region, and the moving body is stopped when the moving body is determined to enter the region. With such a function, if the interference region is defined to be narrow, however, the moving body is not immediately stopped when being moved at a high speed, and can interfere with the structure. On the other hand, if the interference region is defined to be wide in order to overcome such a disadvantage, the travel region is narrowed, compromising workability.

The present invention is directed to solving these problems, and an object of the invention is to make available a machine tool controller that enables an operator to work the moving body by means of simple and worry-free manual operation.

BRIEF SUMMARY OF THE INVENTION

To achieve this object, a controller according to a preferred aspect of the present invention is a machine tool controller for a machine tool including: one or more moving bodies, drive mechanisms that drive the moving bodies to move them, and one or more structures set up in a region in which the moving bodies can move, the machine tool controller comprising: a position control unit that receives an externally manually input operational signal concerning a move-to point and moving speed of the moving bodies, and that controls actuation of the drive mechanisms, based on the received operational signal, to control moving of the moving bodies so that the move-to point and moving speed coincide with those that depend on the operational signal; a modeling data memory that stores modeling data relating to two-dimensional or three-dimensional model of, and including at least geometry data defining the shapes of, the moving bodies and structures and; a speed limit data memory that stores a speed limit of the moving bodies in one or more speed control regions, the speed limit being defined for each of the speed control regions obtained by offsetting outward the contour of the moving bodies and/or structures, and being lower than the speed limit outside the offset orientation in the speed control regions; a travel area checking unit that arranges the one or more speed control regions for the two-dimensional or three-dimensional model of the moving bodies and/or structures as well as receives from the position control unit an actual position of the moving bodies, and that generates, based on the arranged speed control regions, on the received actual position, and on the modeling data stored in the modeling data memory, modeling data of a situation in which the moving bodies are moved into the move-to point to execute a process of checking whether or not the moving bodies and structures move relatively within the speed control regions, and when determining that the moving bodies and structures move within the speed control regions, recognizes in which region the moving bodies and structures move, and recognizes the speed limit corresponding to the recognized region, to execute a process of sending the recognized speed limit to the position control unit, and the position control unit is configured to move the moving bodies at the received speed limit, when the moving speed that depends on the operational signal exceeds the speed limit received from the travel area checking unit.

With this aspect of the present invention, first, the modeling data including at least the geometry data defining the shapes of, and relating to the two-dimensional or three-dimensional model of, the moving bodies and structures is previously generated as appropriate, and then stored in the modeling data memory.

Specifically, examples of the moving bodies and structures may include, if the machine tool is a lathe, for instance: the bed, the headstock disposed on the bed, the spindle rotatably supported by the headstock, the chuck mounted to the spindle to hold the workpiece, the saddle moveably disposed on the bed, the tool rest disposed on the saddle and holding the tool, the tool, the tailstock moveably disposed on the bed, and the tailstock spindle held in the tailstock. Or, if the machine tool is a machining center, for instance, the bed, the column disposed on the bed, the spindle head moveably supported on the column, the spindle rotatably supported by the spindle head to hold the tool, the tool, and the table moveably disposed on the bed to hold the workpiece are also examples of the moving bodies and structures. Moreover, covers and guards are also typically provided to the machine tool in order to prevent the intrusion of chips and cutting fluid, so these covers and guards are also examples of the moving bodies and structures.

The modeling data of all the moving bodies and structures making up the machine tool, however, is not necessarily stored. At least, the modeling data of the moving bodies and structures that require speed control in an adjacent region to them may be stored. Specifically, for example, with the lathe, to control the moving speed of the tool in an adjacent region to the workpiece, the modeling data of the tool and workpiece may be stored, and to control the tool rest and tool in adjacent regions to the headstock, spindle, chuck and workpiece, and to the tailstock and tailstock spindle, the modeling data of the tool rest, tool, headstock, spindle, chuck, workpiece, tailstock and tailstock spindle may be stored. Furthermore, for example, with a machining center, to control the moving speed of the tool in the adjacent region to the workpiece, likewise the modeling data of the tool and workpiece may be stored, and to control the moving speed of the spindle head, spindle and tool in an adjacent region to the table and workpiece, the modeling data of the spindle head, spindle, tool, table and workpiece may be stored.

The modeling data may be generated as large as, and may be generated so as to be slightly larger than, the actual moving bodies and structures.

The speed limit of the moving bodies in the speed control regions—the speed limit is defined for each of the one or more speed control regions obtained by offsetting outward the contour of the moving bodies and/or structures—is previously generated as appropriately, and is stored in the speed limit data memory. This speed limit is defined to be lower than the speed outside the offset orientation in the speed control regions.

Subsequently, when the operational signal concerning the move-to point and moving speed of the moving bodies is externally input manually, the position control unit controls the actuation of the drive mechanisms, and thus the moving bodies move into an instructed position at a speed that depends on the operational signal. At this time, the travel area checking unit checks, based on the moving of the moving bodies, whether or not the moving bodies and structures move relatively within the speed control regions, and sends to the position control unit the speed limit stored in the speed limit data memory, when determining that they move relatively in the regions.

More precisely, first, one or more speed control regions are arranged for the two-dimensional or three-dimensional model of the moving bodies and/or structures and the actual position of the moving bodies is received, and then, based on the arranged speed control regions, on the received actual position, and on the modeling data stored in the modeling data memory, the modeling data of a situation in which the moving bodies are moved to the actual position is generated to check whether or not the moving bodies and structures move relatively within the speed control regions.

Whether or not the moving bodies and structures move relatively within the speed control regions is determined, based on, for example, the presence of the modeling data of the moving bodies in the speed control regions for the structures, or the presence of the modeling data of the structures in the speed control regions for the moving bodies.

When the moving bodies and structures are determined to move relatively within the speed control regions, it is recognized in which speed control region they move, and meanwhile the speed limit data memory-storing speed limit corresponding to the recognized speed control region is recognized, to send the recognized speed limit to the position control unit. Receiving the speed limit, the position control unit controls the actuation of the drive mechanisms to move the moving bodies at the received speed limit, when the moving speed that depends on the operational signal exceeds the received speed limit.

With the machine tool controller according to this aspect of the present invention, one or more speed control regions are arranged in the surrounding area of the moving bodies and/or structures, and the speed limit of the moving bodies in the speed control regions is defined so as to be lower than that outside the regions, to allow the moving bodies to move within the speed control regions only at lower speeds than that outside the regions, so that the moving bodies can be moved at a decreasing speed to the predetermined move-to point in the vicinity to the structures, with no need to control the feedrate override to adjust the moving speed of the moving bodies in the traditional manner. Therefore, the operator is able to move the moving bodies without difficulties.

Furthermore, in the speed control regions (near the structures), the moving bodies can be moved only at lower moving speeds than the speed limit, so that even if the operator makes an operational mistake, the possible occurrence of the interference between the moving bodies and the structures due to a high moving speed of the moving bodies does not worry the operator, because the moving bodies are prevented from moving at higher speeds than the speed limit.

Feasible is a configuration in which the machine tool controller further comprises a move-to point predictor that receives from the position control unit the actual position and speed of the moving bodies to predict, from the received actual position and speed, the move-to point into which the moving bodies are moved after a predetermined time period, and the travel area checking unit is configured to arrange one or more speed control regions for the two-dimensional or three-dimensional model of the moving bodies and/or structures, as well as generate, based on the arranged speed control regions, on the move-to point predicted by the move-to point predictor, and on the modeling data stored in the modeling data memory, modeling data of the situation in which the moving bodies are moved into to the predicted move-to point, to execute a process of checking whether or not the moving bodies and the structures move relatively within the speed control regions, and when determining that they move within the speed control regions, to recognize in which speed control region they move, as well as recognize the speed limit data memory-storing speed limit corresponding to the recognized speed control region, to execute a process of sending the recognized speed limit to the position control unit.

Such a configuration makes it possible to check, based on the move-to point into which the moving bodies move after the predetermine time period, being predicted by the move-to point predictor, whether or not the moving bodies and structures move relatively within the speed control regions, enabling more appropriate speed control.

Additionally, the machine tool controller may be set up to the machine tool further including a screen display device that displays image data, and may further comprise an image data generator that receives from the position control unit the actual position of the moving bodies to generate, based on the received actual position and the modeling data stored in the modeling data memory, the modeling data of the situation in which the moving bodies are moved into the actual position, and that produces two-dimensional or three-dimensional image data that depends on the generated modeling data to display the produced image data on a screen of the screen display device. Such a machine tool controller enables the operator to recognize from the image displayed on the screen display device the positional relationship between the moving bodies and the structures.

Moreover, the image data generator may have the following configuration, in place of the configuration described above: the image data generator generates, based on the move-to point predicted by the move-to point predictor and the modeling data stored in the modeling data memory, the modeling data of the situation in which the moving bodies are moved into the predicted move-to point, and produces the two-dimensional or three-dimensional image data that depends on the modeling data according to the generated modeling data to display the produced image data on the screen of the screen display device. This configuration brings the same advantage with the above example.

Also feasible is a configuration in which the travel area checking unit checks whether or not the moving bodies and the structures interfere with each other, and when determining that the interference occurs, executes an another process of sending the stop signal to the position control unit, in addition to the processes descried above, and the position control unit stops the moving of the moving bodies, when receiving the stop signal from the travel area checking unit.

In such a configuration, the travel area checking unit further checks, based on the generated modeling data, whether or not the moving bodies and the structures interfere with each other, and when determining that the interference occurs, sends the stop signal to the position control unit. Receiving the stop signal, the position control unit stops the actuation of the drive mechanisms to halt the moving of the moving bodies.

Whether or not the moving bodies and the structures interfere with each other is determined, based on, for example, the presence of a portion in which the modeling data of the moving bodies contacts or overlaps with the modeling data of the structures. If there is the contacting or overlapping portion between the modeling data of the moving bodies and structures, the moving bodies and the structures are determined to interfere with each other. Additionally, in the event that the moving body and structure is the tool and workpiece respectively and there is overlap between the modeling data of the tool and workpiece, the tool and the workpiece are determined to interfere with each other, if this overlap dose not arise between the blade of the tool and the workpiece. On the other hand, even if the overlap arises between the blade of the tool and the workpiece, the tool and the workpiece are determined to interfere with each other, when the moving speed (feedrate) is grater than a certain speed.

As described above, because the speed limit in the speed control regions is defined to be lower than that outside the regions, the moving bodies are stopped without fail before they interfere with the structures, even if an interference regions in which the moving bodies and the structures interfere with each other are defined to be narrow. In addition, defining narrow interference region widens the travel area of the moving bodies, realizing the improved workability of the operator.

With the machine tool according to this aspect of the present invention, in a situation in which the event that the moving bodies are moved to the predetermined move-to point in the vicinity of the structures, because there is no need to control the feedrate override to adjust the moving speed of the moving bodies, the operator can move the moving bodies without difficulties. Moreover, the moving bodies can be moved only at low speeds, so that possible occurrence of the interference between the moving bodies and the structures dose not worry the operator. Even if the narrow interference range is defined in order to widen the travel area of the moving bodies so as to improve the workability of the operator, the moving bodies can be stopped before the moving bodies interfere with the structures.

From the following detailed description in conjunction with the accompanying drawings, the foregoing and other objects, features, aspects and advantages of the present invention will become readily apparent to those skilled in the art.

BRIEF DESCRIPTION OF THE SEVERAL VIEWS OF THE DRAWINGS

FIG. 3 is an explanatory diagram illustrating the data structures of the interference data stored in the interference data memory in accordance with this embodiment.

FIG. 4 is an explanatory diagram illustrating the data structures of the speed limit data stored in the speed limit data memory in accordance with this embodiment.

FIG. 5 is an explanatory diagram used to describe the speed control regions in accordance with this embodiment.

DETAILED DESCRIPTION OF THE INVENTION

The following is a description of preferred embodiments of the present invention made with reference to the appended drawings.

Figure 1:
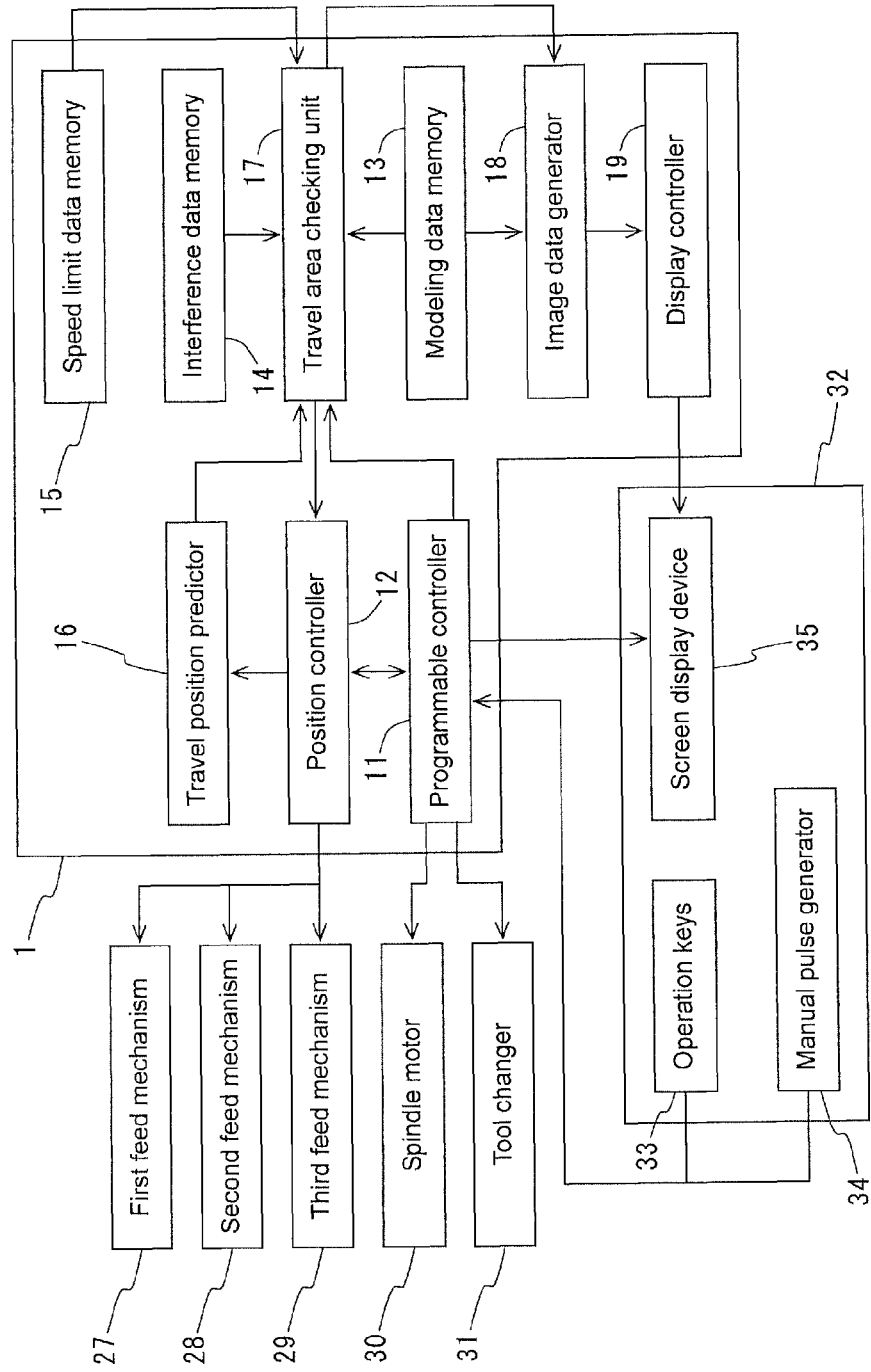
FIG. 1 is a schematic block diagram illustrating the constitution of the machine tool controller in accordance with a first embodiment of the present invention.

As shown in FIG. 1, the machine tool controller (hereinafter referred to as controller) 1 in this example is provided in a NC lathe 20, and comprises a programmable controller 11, a position control unit 12, a modeling data memory 13, an interference data memory 14, a speed limit data memory 15, move-to point predictor 16, travel area checking unit 17, an image data generator 18, and a display controller 19.

Figure 2:
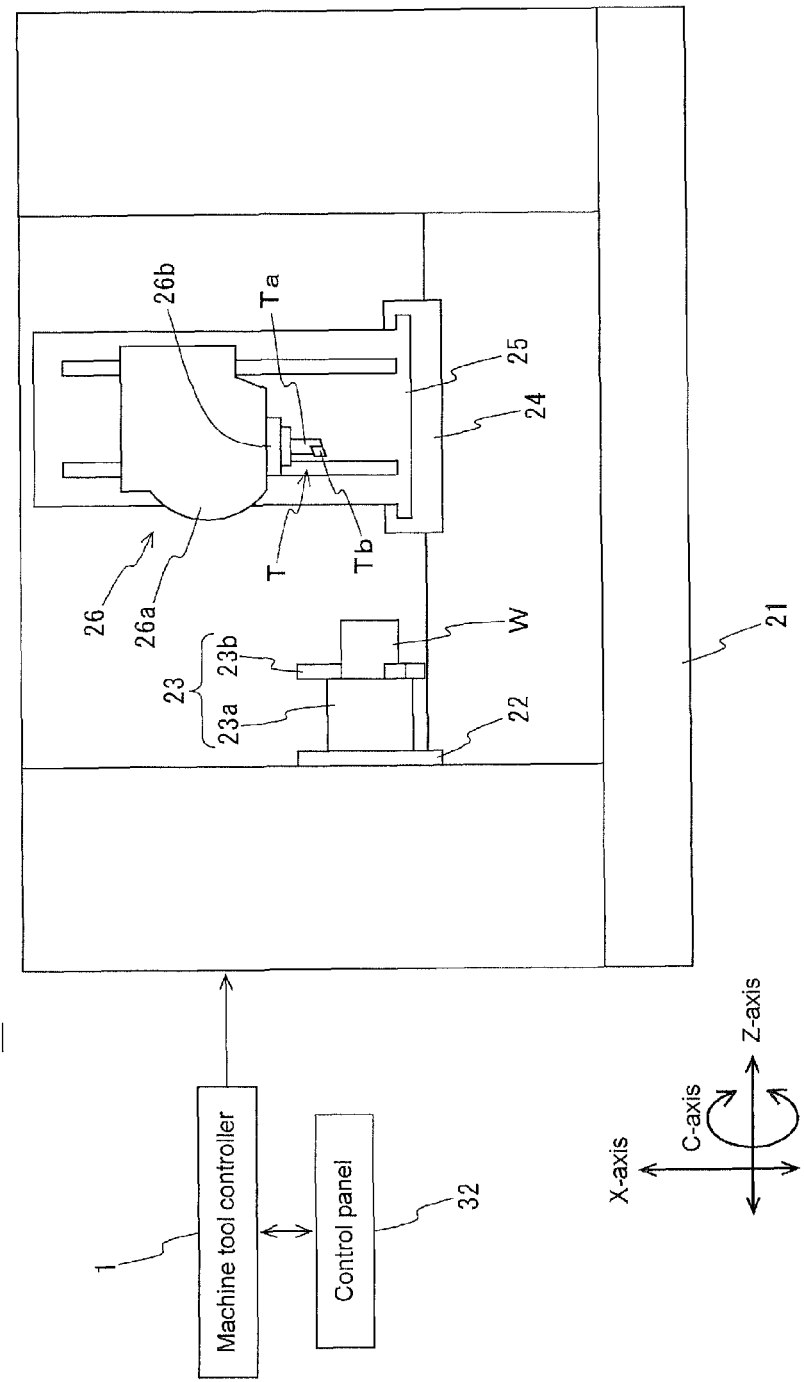
FIG. 2 is a schematic front view illustrating the constitution of a numerically-controlled (NC) lathe provided with the machine tool controller in accordance with this embodiment.
Figure 6:
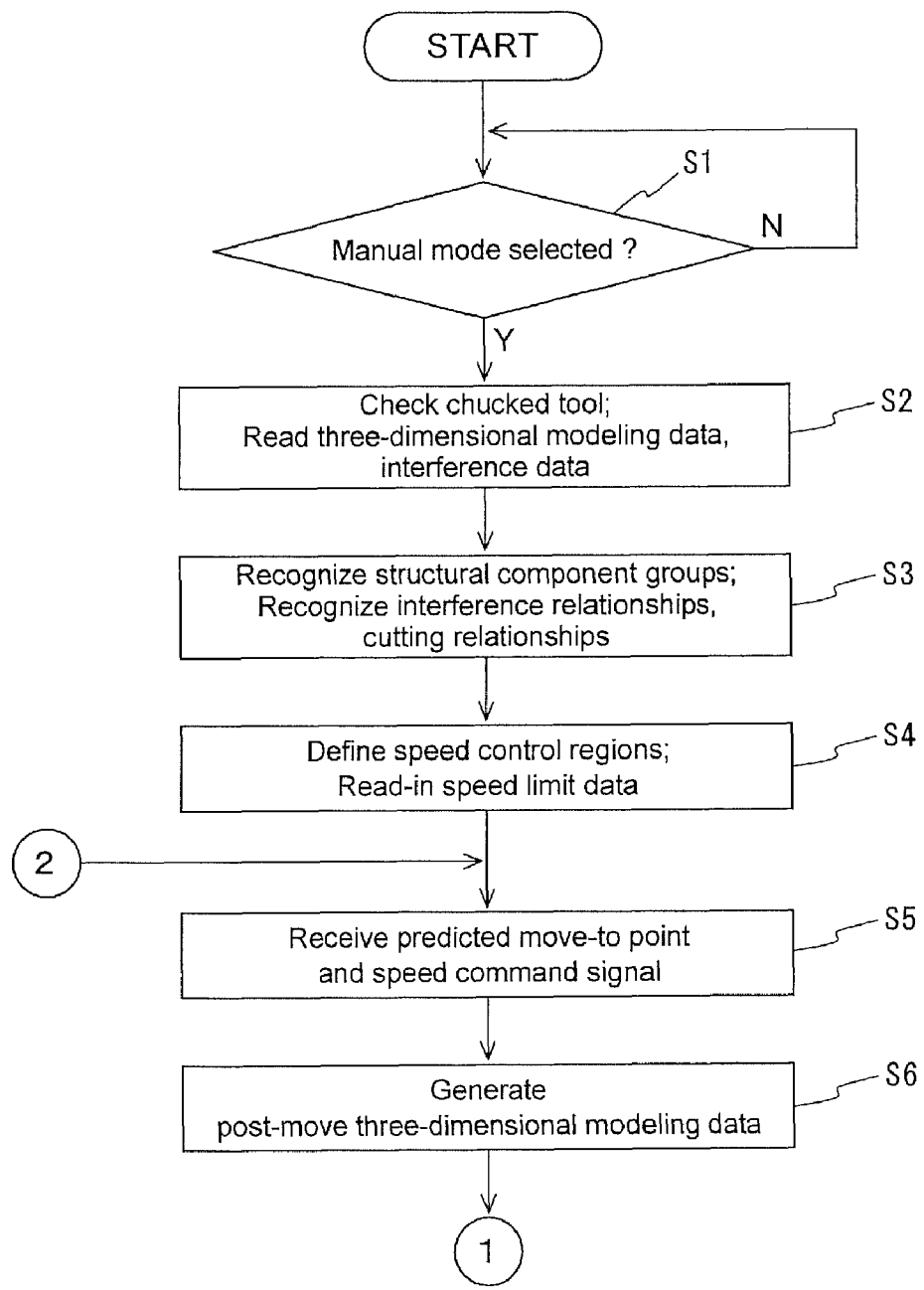
FIG. 6 through FIG. 9 are flowcharts showing a series of processes performed by the travel area checking unit in accordance with this embodiment.
Figure 7:
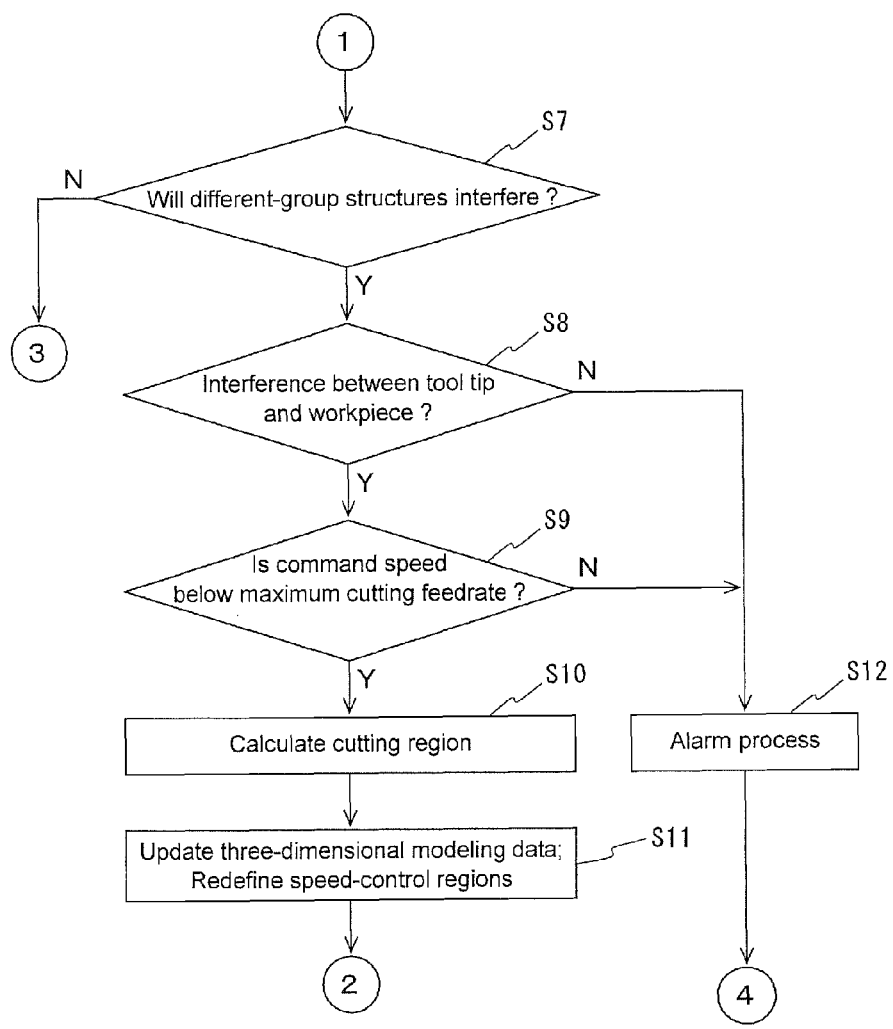
Figure 8:
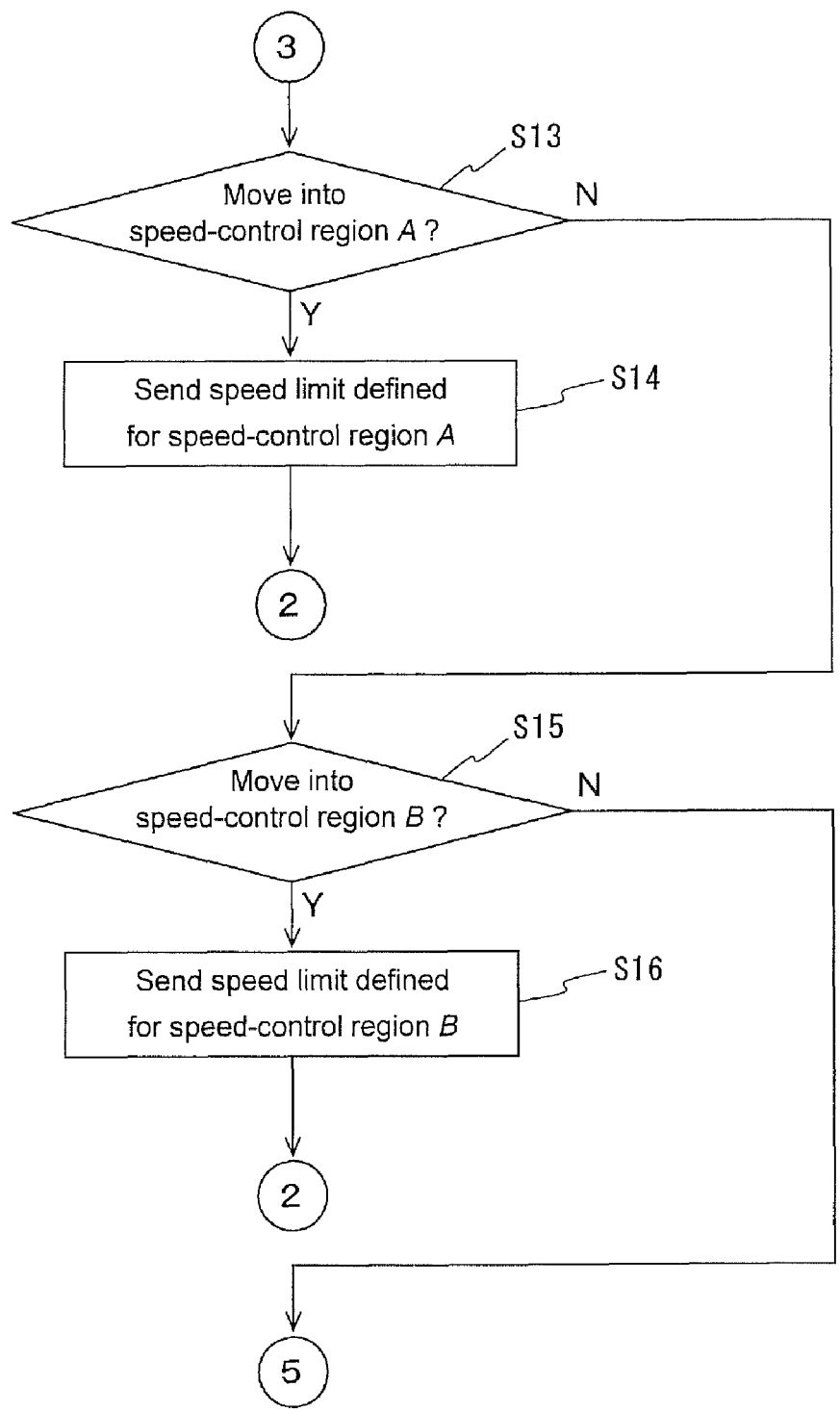
Figure 9:
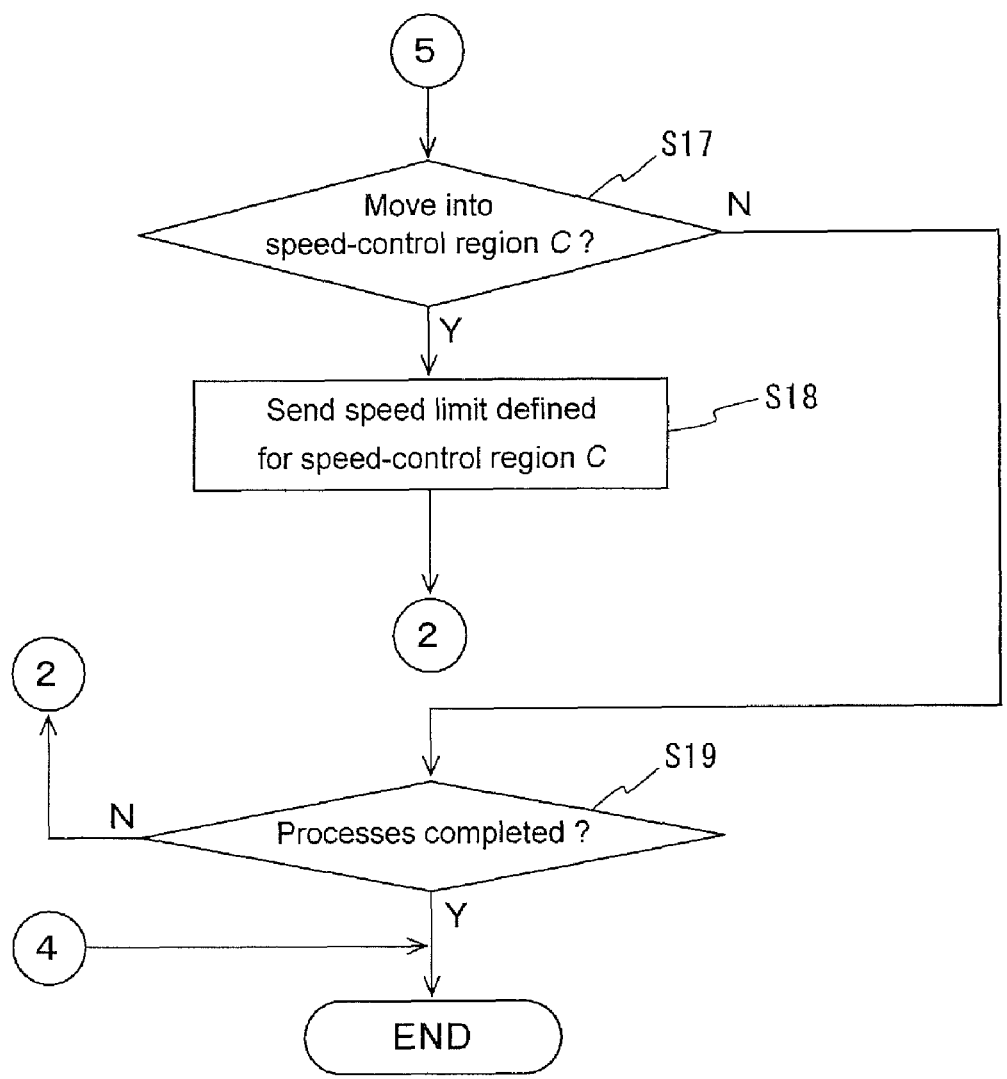

The NC lathe 20 will be explained first. As shown in FIG. 1 and FIG. 2, the NC lathe 20 is constituted by comprising the structures of a bed 21, a headstock (not shown) disposed on the bed 21, a spindle 22 supported so as to be rotated around a horizontal central axis by the headstock (not shown)

(around the Z-axis (in the direction of the C-axis)), a chuck 23 mounted to the spindle 22, a first saddle 24 provided on the bed 21 such that it is able to move in the direction of the Z-axis, a second saddle 25 provided on the first saddle 24 such that it is able to move in the direction of the Y-axis which is orthogonal to the Z-axis in a horizontal plane, a tool rest 26 disposed on the second saddle 25 such that it is able to move in the direction of the X-axis that is orthogonal to both the Y-axis and the Z-axis, along with a first feed mechanism 27 that moves the first saddle 24 in the direction of the Z-axis, a second feed mechanism 28 that moves the second saddle 25 in the direction of the Y-axis, a third feed mechanism 29 that moves the tool rest 26 in the direction of the X-axis, a spindle motor 30 that rotates the spindle 22 around its central axis, a tool changer 31 that exchanges a tool T held in the tool rest 26 for a new tool T, a control panel 32 through which a signal is input to the controller 1, and the controller that controls the actuation of feed mechanisms 27, 28, 29, the spindle motor 30, and tool changer 31.

The chuck 23 comprises a chuck body 23a and a plurality of jaws 23b attached to the chuck body 23a that hold the workpiece W, and the tool rest 26 is provided with a tool rest body 26a and a tool spindle 26b disposed on the tool rest body 26a that holds the tool T. In addition, the tool T comprises a tool body Ta and a tip (blade portion) Tb that is mounted to the tool body Ta and that machines the workpiece W.

The control panel 32 comprises a operation keys 33 for inputting a various signals to the controller 1, manual pulse generator 34 for inputting a pulse signal to the controller 1, and a screen display device 35 for displaying on a screen a state of control under the controller 1.

The operation keys 33 includes a operation mode selector switch for switching between automatic and manual operations, a feed shaft selector switch for selecting feed shafts (X-axis, Y-axis and Z-axis), a move button for moving the first saddle 24, second saddle 25, or tool rest 26 along the feed shaft selected by using the feed shaft selector switch, and a control knob for controlling feed rate override. The operational signals from the operation mode selector switch, feed shaft selector switch, move button and control knob is sent to the controller 1.

The manual pulse generator 34 comprises the feed shaft selector switch for selecting feed shafts (X-axis, Y-axis and Z-axis), a magnification rate selector switch for selecting the amounts of travel per 1 pulse, and an axially rotatable pulse handle, which is axially rotated to generate a pulse signal that depends on the amount of the rotation. The operational signals from the feed shaft selector switch, magnification rate selector switch and pulse handle are sent to the controller 1.

Next, the controller 1 will be explained. As described above, the controller 1 are provided with the programmable controller 11, position control unit 12, modeling data memory 13, interference data memory 14, speed limit data memory 15, the move-to point predictor 16, the travel area checking unit 17, the image data generator 18 and the display controller 19.

The programmable controller 11 receives a manipulate signal from the operation keys 33 and the manual pulse generator 34, and sends to the position control unit 12 an operational signal for the feed mechanisms 27, 28, 29, based on the received manipulate signal.

For example, if the move button in the operation keys 33 is pressed, with the operation mode selector switch in the manual operation position, it is recognized, based on the feed shaft selected by means of the feed shaft selector switch, which of the feed mechanisms 27, 28, 29 is to be actuated, and the feedrate override adjustment is also recognized based on the control knob position, to send the operational signal including information on recognized one of the feed mechanisms 27, 28, 29 and the moving speed that depends on the recognized adjusted value. In addition, if the pulse handle of the manual pulse generator 34 is operated, with the operation mode selector switch in the manual operation position, it is recognized, based on the feed shaft selected by means of the feed shaft selector switch, which of the feed mechanisms 27, 28, 29 is to be actuated, and the amount of travel per 1 pulse is recognized based on the magnification rate selected by means of the magnification rate selector switch, to send the operational signal including information on recognized one of the feed mechanisms 27, 28, 29, on the recognized amount of travel per 1 pulse, and on the pulse signal generated by means of the pulse handle.

The programmable controller 11 controls the actuation of the spindle motor 30 and the tool changer 31, based on a signal received from the operation keys 33. Furthermore, the programmable controller 11 sends information on the tool T held in the tool rest 26 to the travel areas checking device 17, and when the operation mode is switched to the manual operation by means of the operation mode selector switch, sends a signal indicating the operation mode change.

The position control unit 12 controls the actuation of the feed mechanisms 27, 28, 29, based on the operational signal received from the programmable controller 11 and on the NC program stored in a memory as appropriate. For example, the actuation of the feed mechanisms 27, 28, 29 is controlled based on the NC program, when the operation mode selector switch is in the automatic operation position. On the other hand, when the operation mode selector switch is in the manual operation position, the actuation is controlled based on the operational signal received from the programmable controller 11.

Furthermore, when receiving an alarm signal from the travel area checking unit 17, the position control unit 12 stops the actuation of the feed mechanisms 27, 28, 29, regardless of the operational signal received from the programmable controller 11.

Moreover, when receiving a speed limit from the travel area checking unit 17, the position control unit 12 controls the actuation of the feed mechanisms 27, 28, 29 so that the moving speed of the first saddle 24, second saddle 25 and tool rest 26 coincides with the received speed limit, if the travel speed, that depends on the adjusted value of the feedrate override and on the magnification rate of the magnification rate selector switch, of the first saddle 24, second saddle 25 and tool rest 26 exceeds the received speed limit, and the position control unit 12 controls the actuation of the feed mechanisms 27, 28, 29 so that the moving speed of the first saddle 24, second saddle 25 and the tool rest 26 coincides with the speed that depends on the adjusted value of the federate override and the magnification rate of the magnification rate selector switch if the travel speed, that depends on the adjusted value of the feedrate override and on the magnification rate of the magnification rate selector switch, of the first saddle 24, second saddle 25 and tool rest 26 dose not exceed the received speed limit.

Specifically, for example, if a command speed included in the operational signal received from the programmable controller 11 exceeds the received speed limit, a control signal is generated based on the speed limit, and is sent to the feed mechanisms 27, 28, 29, to move the first saddle 24, second saddle 25 and tool rest 26 at this speed limit. If the command speed dose not exceed the received speed limit, the control signal is generated based on the command speed, and is sent to the feed mechanisms 27, 28, 29, to move the first saddle 24, second saddle 25 and tool rest 26 at the command speed. In addition, if the moving speed according to the control signal generated based on the operational signal received from the programmable controller 11 and sent to feed mechanisms 27, 28, 29 exceeds the received speed limit, the generated control signal is readjusted to the control signal making the moving speed of the first saddle 24, second saddle 25 and tool rest 26 not exceed the speed limit, and the readjusted control signal is sent directly to the feed mechanisms 27, 28, 29, to move the first saddle 24, second saddle 25 and tool rest 26 at the moving speed corresponding to the readjusted control signal.

It is to be noted that the position control unit 12 is configured to receive an actual position and speed of the first saddle 24, second saddle 25 and tool rest 26, and to send the received actual position and speed to the move-to point predictor 16.

In the modeling data memory 13, three-dimensional modeling data, previously generated as appropriate by using, for example, a three-dimensional CAD system, on at least the tool T, workpiece W, spindle 22, chuck 23, first saddle 24, second saddle 25, and tool rest 26 is stored. Such three-dimensional modeling data comprises at least geometry data defining the three-dimensional shape of the tool T, workpiece W, spindle 22, chuck 23, first saddle 24, second saddle 25 and tool rest 26.

The three-dimensional modeling data, which is employed as interference region when the interference is checked, may be generated as large as, or so as to be slightly larger than, the actual size of the tool T, workpiece W, spindle 22, chuck 23, first saddle 24, second saddle 25, and tool rest 26.

The interference data that defines preset mutual interference relationships among the tool T, workpiece W, spindle 22, chuck 23, first saddle 24, second saddle 25 and tool rest 26 is stored in the interference data memory 11.

In the NC lathe 20, the spindle 22, chuck 23 and workpiece W are treated as a single unit, as the spindle 22 is supported by the headstock (not shown), while the first saddle 24, second saddle 25, tool rest 26 and tool T are treated as a single unit, as the first saddle 24 is disposed on the bed 21. Accordingly, no interference relationships arise among the spindle 22, chuck 23 and workpiece W, or among the first saddle 24, second saddle 25, tool rest 26 and tool T, so interference relationships arise only between the spindle 22, chuck 23 and workpiece W and the first saddle 24, second saddle 25, tool rest 26 and tool T.

Moreover, interference between the tool T and workpiece W can be assumed to be machining of the workpiece W by the tool T, (that is, no interference), but this cannot be assumed to be machining unless it is between the tip Tb of the tool T and the workpiece W so if not it is interference.

Thus as shown in FIG. 3, specifically, the tool T, workpiece W, spindle 22, chuck 23, first saddle 24, second saddle 25 and tool rest 26 are divided into groups such that those considered to be a unit are put into the same group, and thus set as data that indicates whether they constitute an interference relationship or cutting relationship.

Moreover, based on this interference data, the spindle 22, chuck 23 and workpiece W are grouped together as Group 1, while the first saddle 24, second saddle 25, tool rest 26 and tool T are grouped as Group 2. Note that as described above, interference does not arise among the constituent elements of Group 1 or among the constituent elements of Group 2, but rather interference relationships arise only between constituent elements of Group 1 and constituent elements of Group 2, and even interference between constituent elements belonging to different Groups is not interference in the case that these constituent elements constitute a cutting relationship with each other, or namely if the interfering constituent elements are the tip Tb of the tool T and the workpiece W.

In the speed limit data memory 15, as illustrated in FIG. 4, the speed limit, defined for each of the speed control regions, of the first saddle 24, second saddle 25 and tool rest 26 in the speed control regions is stored.

The speed control regions, as illustrated in FIG. 5, are obtained by offsetting outward the spindle 22, chuck 23 and workpiece W. In this embodiment, three speed control regions having different offsets are defined: a first speed control region A (with an offset of, for example, 80 mm), a second speed control region B (with an offset of, for example, 30 mm) and a third speed control region C (with an offset of, for example, 1 mm). In FIG. 5, the illustrations of the spindle 22 and the tool rest body 26a are omitted.

The speed limit is defined as 12500 mm/min in the first speed control regions A, 5000 mm/min in the second speed control region B, 1000 mm/min in the third speed control region. The speed limit in the first speed control region A is lower than that outside the offset orientation, the speed limit in the second speed control region B is lower than that outside the offset orientation and the speed limit in the third speed control region C is lower than that outside the offset orientation. The narrower the speed control regions A, B, C, the lower the speed limit. The speed limit of the first saddle 24, second saddle 25 and the tool rest 26 is determined to be lower than 12500 mm/min.

The move-to point predictor 16 receives from the position control unit 12 the actual position and speed of the first saddle 24, second saddle 25 and the tool rest 26 to predict, from the received actual position and speed, the move-to point into which they are moved after a predetermine time period, and then sends to the travel area checking unit 17 the predicted move-to point and the actual speed received from the position control unit 12.

The travel area checking unit 17 receives successively the predicted move-to point of the first saddle 24, second saddle 25 and the tool rest 26 from the move-to point predictor 16, and checks, based on the received predicted move-to point and on the data stored in the modeling data memory 13 and the interference data memory 14, whether or not mutual interference occur among the tool T, workpiece W, spindle 22, chuck 23, first saddle 24, second saddle 25 and tool rest 26, and meanwhile checks whether or not the first saddle 24, second saddle 25, tool rest 26, and tool T move in the speed control regions A, B, C for the workpiece W, spindle 22 and chuck 23.

More specifically, the travel area checking unit 17 is configured to successively execute a series of processes as illustrated in FIG. 6 through FIG. 9. First, whether or not the signal indicating that the operation mode is switched to the manual operation is received from the programmable controller 11 (Step S1), and when the signal is received, the processes in step 2 or later are executed.

In Step S2, the tool T held in the tool rest 26 is recognized, based on the information, received form the programmable controller 11, on the tool T held in the tool rest 26, and the three-dimensional modeling data, stored in the modeling data memory 13, of the tool T, workpiece W, spindle 22, chuck 23, first saddle 24, second saddle 25 and tool rest 26 and the interference data stored in the interference data memory 14 are read in. To read in the three-dimensional modeling data of the tool T, the three-dimensional modeling data of the recognized tool T is read in.

Next, the interference data read in is referred to recognize groups to which the tool T, workpiece W, spindle 22, chuck 23, first saddle 24, second saddle 25 and tool rest 26 belong, and which of a cutting relationship and an interference relationship each of the groups constitutes is recognized (Step S3).

Then, the three speed control regions A, B, C are defined for the spindle 22, chuck 23 and workpiece W, and meanwhile the speed limit stored in the speed limit data memory 15 is read in (Step S4), the predicted move-to point of tool rest 26 and the operational signal (command speed signal) relating to the moving speed are received from the move-to point predictor 16 and from the programmable controller 11 respectively (Step S5), and the three-dimensional modeling data describing that the first saddle 24, second saddle 25 and tool rest 26 are moved into the predicted move-to point is generated, based on the three-dimensional modeling data read in, defined three speed control regions A, B, C and the received predicted move-to point (Step S6).

Subsequently, based on the interference data read in and on the generated three-dimensional modeling data, a check is made as to whether or not moving of the first saddle 24, second saddle 25 and tool rest 26 will cause mutual interference among the tool T, workpiece W, spindle 22, chuck 23, first saddle 24, second saddle 25 and tool rest 26, or namely, a check is made for the presence of portions of contact or overlap among the three-dimensional modeling data sets for structures belonging to different groups (namely among the three-dimensional modeling data sets for the spindle 22, chuck 23 and workpiece W belonging to Group 1 and the three-dimensional modeling data sets for the first saddle 24, second saddle 25, tool rest 26 and tool T belonging to Group 2) (Step S7).

If contact or overlap is determined to be present in Step S7, a check is made as to whether or not the contact or overlap occurred among constituent elements constituting a cutting relationship to each other, namely whether or not it occurred between the tip Tb of the tool T and the workpiece W (Step S8). If this is determined to be so, whether or not the received command speed is less than the maximum feedrate for cutting is checked (Step S9).

If the feedrate is determined to be less than the maximum feedrate for cutting in Step S9, the contact or overlap in the three-dimensional modeling data is determined to have been resulted from that the workpiece W is machined by the tool T, and that overlapping region {the interference (cut) region} is calculated (Step S10), the three-dimensional modeling data is updated and the three speed control regions A, B, C are defined again for the three dimensional modeling data (Step S11).

On the other hand, if the contact or overlap is determined in Step S8 not to have occurred among constituent elements constituting a cutting relationship to each other (namely, it did not occur between the tip Tb of the tool T and the workpiece w), interference is determined to have occurred between the spindle 22, chuck 23 and workpiece W and the first saddle 24, second saddle 25, tool rest 26 and tool T, or if the command speed is determined in Step S9 to be greater than the maximum feedrate for cutting, then it cannot be regarded as machining of the workpiece W by the tool T and is thus determined to be interference, so the alarm signal (a stop signal) is sent to the position control unit 12 and image data generator 18 (Step S12), and this series of processes ends.

Moreover, if in Step S7 no portions of contact or overlap are determined to be present (no interference has occurred), a check is made as to whether or not the three-dimensional modeling data of the first saddle 24, second saddle 25, tool rest 26 and tool T is present in the first speed control region A (Step S13), and then if their presence is determined, the speed limit (2500 mm/min) read in and defined for the first speed control region A is sent to the position control unit 12, and the processes in Step S5 or later are repeated (Step S14).

On the other hand, if the modeling data of the first saddle 24, second saddle 25, tool rest 26 and tool T are determined in Step S13 not to be present in the first speed control region A, a check is made as to whether or not the three-dimensional modeling data of the first saddle 24, second saddle 25, tool rest 26 and the tool T are present in the second speed control region B (Step S15).

Then, if the presence is determined, the speed limit (5000 mm/min) read in and defined for the second speed control region B is sent to the position control unit 12, and the processes in Step S5 or later Steps are repeated (Step S16). Meanwhile, if the presence is not determined in the second speed control region B, a checking is made as to whether or not the three-dimensional modeling data of the first saddle 24, second saddle 25, tool rest 26 and tool T is present in the third speed control region C (Step S17).

If the presence is determined, the speed limit (1000 mm/min) read in and defined for the third speed control region C is sent to the position control unit 12, and the processes in Step S5 or later Steps are repeated (Step S18). On the other hand, if the presence is not determined in the third speed control region C in Step S17, whether or not the processes end is checked in Step S19. If the processes are not over, the processes in Step S5 or later Steps are repeated, and when the processes are determined to end, the serried of the processes is over.

The travel area checking unit 17 is configured to, when determining that the three-dimensional modeling data of the first saddle 24, second saddle 25, tool rest 26 and tool T is present in the speed control regions A, B, C, send to the image data generator 18 the data indicating the presence of the three-dimensional modeling data.

Figure 10:
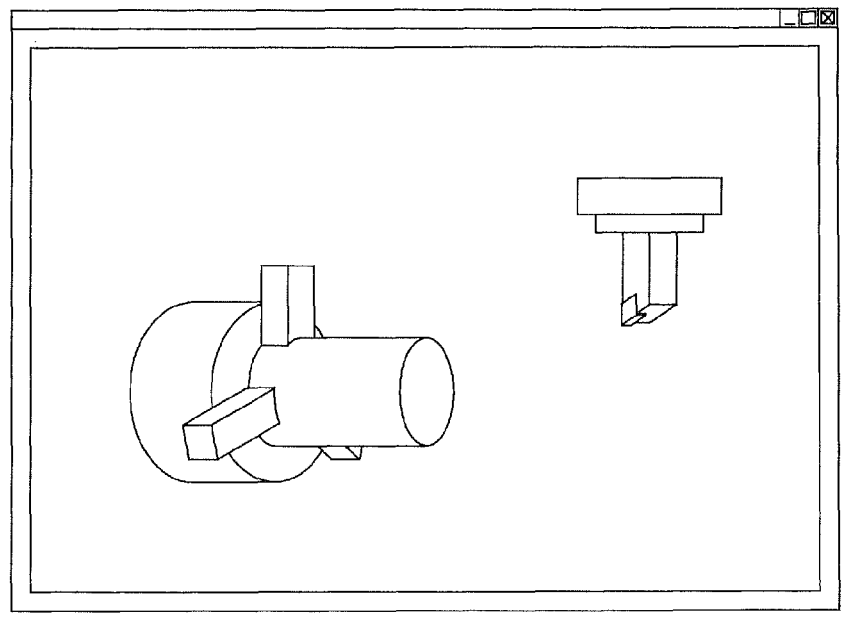
FIG. 10 and FIG. 11 are explanatory diagrams illustrating an example of a display screen generated by the image data generator in accordance with this embodiment and displayed on the image display device.

The image data generator 18 successively receives from the travel area checking unit 17 the predicted move-to point of the first saddle 24, second saddle 25 and tool rest 26 to generate, based on the received predicted move-to point and on the modeling data memory 13-storing three-dimensional modeling data of the tool T, workpiece W, spindle 22, chuck 23, and tool rest 26, the three-dimensional modeling data describing that the first saddle 24, second saddle 25 and tool rest 26 are moved into the predicted move-to point, and produces the three-dimensional image data (refer to FIG. 10 and FIG. 11) that depends on the generated three-dimensional modeling data to send the produced three-dimensional image data to the display controller 19. It is to be noted that FIG. 10 illustrates the situation in which the first saddle 24, second saddle 25, tool rest 26 and tool T are not present in any speed control regions A, B, C, and FIG. 11 illustrates the situation in which the first saddle 24, second saddle 25, tool rest 26 and tool T are present in the first speed control region A.

Figure 11:
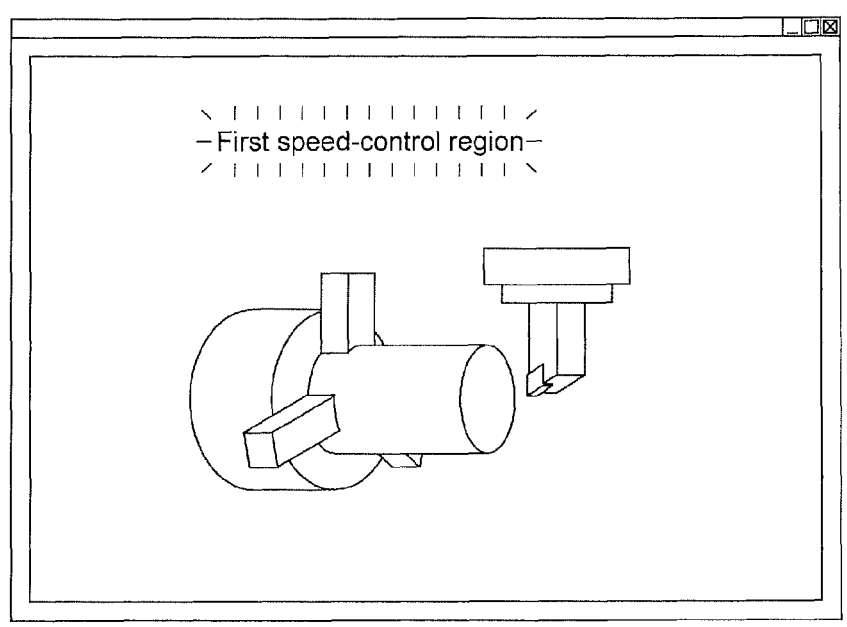

Furthermore, when receiving the alarm signal from the travel area checking unit 17, the image data generator 18 generates an alarm image to send it to the display controller 19, and generates, when receiving from the travel area checking unit 17 a signal indicating that the three-dimensional modeling data of the first saddle 24, second saddle 25, tool rest 26 and tool T enters the speed control regions A, B, C, the image data describing into which of the speed control regions A, B, C the three-dimensional modeling data enters to send the image data to the display controller 19 (refer to FIG. 11). In which of the speed control regions A, B, C the first saddle 24, second saddle 25, tool rest 26 and tool T are present is indicated by, for example, blinking.

The display controller 19 receives the image data from the image data generator 18 to display the image data on the screen of the screen display device 35.

With the controller 1 of this embodiment constituted as described above, three-dimensional modeling data for at least the tool T, workpiece W, spindle 22, chuck 23, first saddle 24, second saddle 25 and tool rest 26 are stored in advance in the modeling data memory 13, and interference data that defines mutual interference relationships among the tool T, workpiece W, spindle 22, chuck 23, first saddle 24, second saddle 25 and tool rest 26 is stored in advance in the interference data memory 14, and the speed limit, defined for each of the speed control regions A, B, C, of the first saddle 24, second saddle 25 and tool rest 26, is stored in the speed limit data memory 15.

When the manipulate signal from the control keys 33 and manual pulse generator 34 is inputted into the programmable controller 11, and the operational signal that depends on the manipulate signal is sent to the position control unit 12, the feed mechanisms 27, 28, 29 are driven under the control of the position control unit 12, and thus the first saddle 24, second saddle 25 and tool rest 26 are moved. At this time, based on the predicted move-to point, predicted by the move-to point predictor 16, of the first saddle 24, second saddle 25 and tool rest 26, on the command speed, and on the data stored in the modeling data memory 13, interference data memory 14 and speed limit data memory 15, the travel area checking unit 17 checks whether or not mutual interference occurs among the tool T, workpiece W, spindle 22, chuck 23, first saddle 24, second saddle 25 and tool rest 26, and also checks whether or not the first saddle 24, second saddle 25, tool rest 26 and tool T move in the speed control regions A, B, C for the workpiece W, spindle 22 and chuck 23.

And then, if the interference is determined to occur, the alarm signal is sent to the position control unit 12 and the image data generator 18, and thus the position control unit 12 stops the feed mechanisms 27, 28, 29 and the image data generator 18 generates the alarm image to display it on the screen of the screen display device 35.

On the other hand, when the first saddle 24, second saddle 25, tool rest 26 and tool T are determined to move within the speed control regions A, B, C, the speed limit defined for the speed control regions A, B, C into which they move is sent to the position control unit 12. If the moving speed of the first saddle 24, second saddle 25 and tool rest 26 exceeds the speed limit, the position control unit 12 controls the feed mechanisms 27, 28, 29 so as to move the first saddle 24, second saddle 25 and tool rest 26 at the speed limit. That is to say, the first saddle 24, second saddle 25 and tool rest 26 are controlled to move at a speed of 12500 mm/min or less within the first speed control region A, at a speed of 5000 mm/min or less within the second speed control region B, and at a speed of 1000 mm/min or less within the third speed control region C. In addition, when they move into the speed control regions A, B, C, the image data describing that they move into the regions is generated by the image data generator 18, and is displayed on the screen of the screen display device 35.

With the controller 1 according to this embodiment, the three speed control regions A, B, C are arranged in surrounding area of the workpiece W, spindle 22 and chuck 23, and the speed limit of the first saddle 24, second saddle 25 and tool rest 26 in the speed control regions A, B, C is defined to be lower than that outside the regions, to allow the first saddle 24, second saddle 25 and tool rest 26 to move in the speed control regions A, B, C only at a speed lower than that outside the regions, so that the first saddle 24, second saddle 25 and tool rest 26 can be moved into the predetermined move-to point in the vicinity of the workpiece W, spindle 22 and chuck 23 at a gradually decreasing speed, with no need to conventionally control the feedrate override to adjust the moving speed of the first saddle 24, second saddle 25 and tool rest 26. Therefore, the operators are able to move the first saddle 24, second saddle 25 and tool rest 26 without difficulties.

Moreover, because the first saddle 24, second saddle 25 and tool rest 26 can be moved within the speed control regions A, B, C (near the workpiece W, spindle 22 and chuck) only at speeds lower than the speed limit, even if an operator makes an operational mistake, the first saddle 24, second saddle 25 and tool rest 26 do not move at speeds higher than the speed limit, so that the operator is not worried that the high moving speed of the first saddle 24, second saddle 25 and tool rest 26 causes the first saddle 24, second saddle 25 and tool rest 26 to interfere with the workpiece W, spindle 22 and chuck 23.

Furthermore, because the speed limit within the speed control regions A, B, C is defined to be low, even if the interference region is defined to be narrow, the first saddle 24, second saddle 25 and tool rest 26 can be stopped before they interfere with the workpiece W, spindle 22 and chuck 23, and moreover defining the interference region to be narrow widens the travel area of the first saddle 24, second saddle 25 and tool rest 26, so that the workability of the operator is improved.

Additionally, based on the move-to point into which the first saddle 24, second saddle 25 and tool rest 26 move after the predetermined time period, being predicted by the move-to point predicting device 16, a check is made as to whether or not mutual interference occurs among the tool T, workpiece W, spindle 22, chuck 23, first saddle 24, second saddle 25 and tool rest 26, and as to whether or not the first saddle 24, second saddle 25, tool rest 26 and tool T move into the speed control regions A, B, C, so that the speed control is performed more properly, the interference is prevented from occurring more securely, and the interference region is defined to be narrow.

Moreover, the image data relating to the status of moving of the first saddle 24, second saddle 25 and tool rest 26 is generated by the image data generator 18, and is displayed on the screen of the screen display device 35, so that the operator, advantageously, through the image displayed on the screen of the screen display device 35, are able to recognize position relationship of the first saddle 24, second saddle 25, tool rest 26 and tool T with the workpiece W spindle 22 and chuck 23, and to identify the portion in which the interference occurs without difficulty.

The above is a description of one embodiment of the present invention, but the specific mode of implementation of the present invention is in no way limited thereto.

The embodiment above presented the NC lathe 20 as one example of the machine tool, but the controller 1 according to this embodiment can also be provided in a machining center or various other types of machine tool. Moreover, the three-dimensional modeling data stored in the modeling data memory 13 may be generated by any means, but in order to perform high-precision interference checking, it is preferable to use data that is generated accurately rather than data that is generated simply. And two-dimensional model, as an alternative to the three-dimensional mode, may be stored in the modeling data memory 13.

Figure 12:
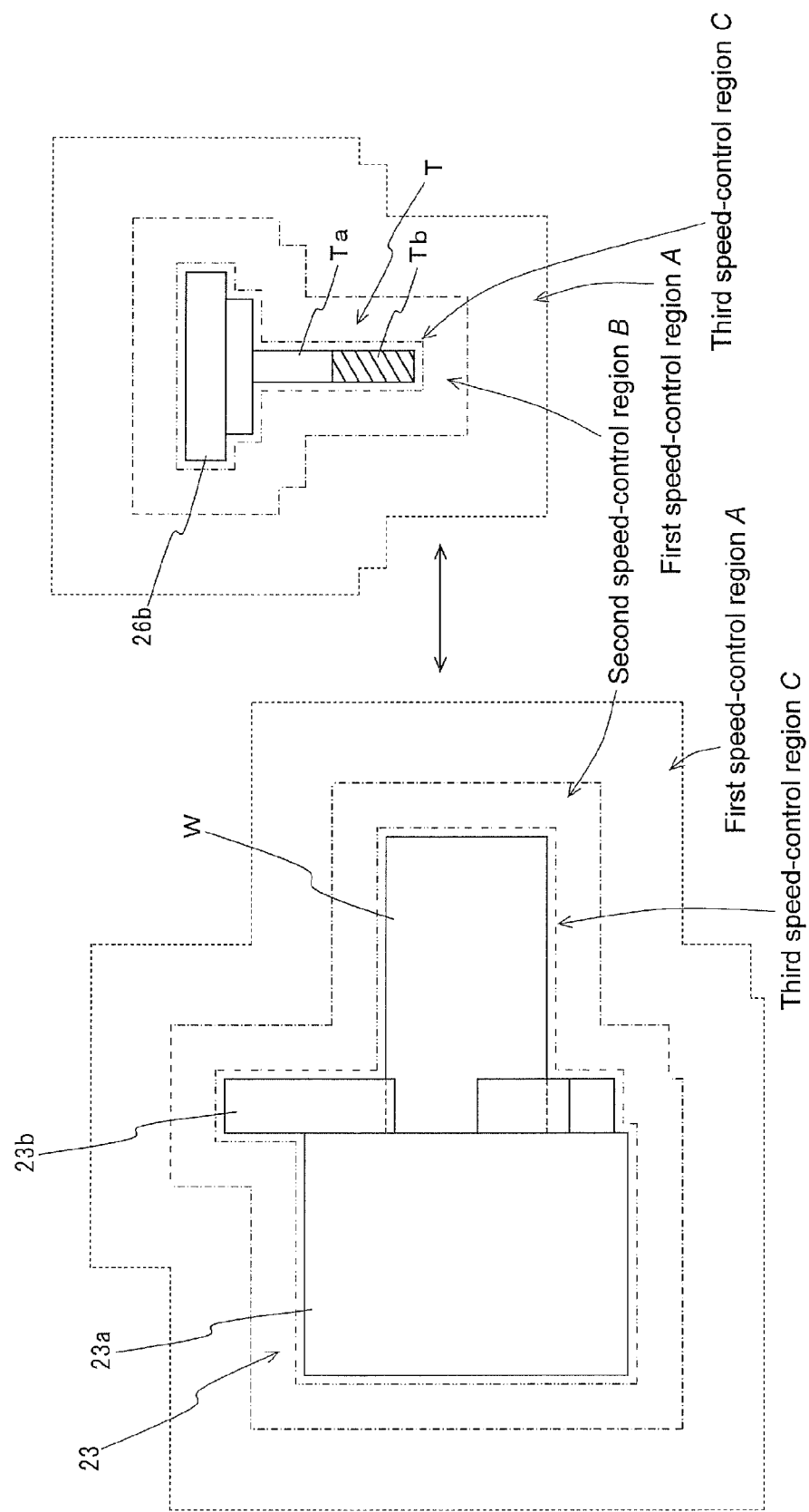
FIG. 12 is an explanatory diagram used to describe the speed control regions in accordance with a second embodiment of the present invention.

Additionally, although the speed control regions A, B, C of this embodiment is defined in surrounding area of the chuck 23 and workpiece W, the regions may be defined, as illustrated in FIG. 12, in both of surrounding areas of the spindle 22, chuck 23 and workpiece W and of the first saddle 24, second saddle 25, tool rest 26 and tool T, or only in the surrounding area of the first saddle 24, second saddle 25, tool rest 26 and tool T. Moreover, the number of speed control regions is not limited to three. As illustrated, the tool T may be rotating tool, such as a drill and an end mill, not cutting tool. The code Ta and Tb illustrate a tool body and blade respectively.

Also in this case, the moving speed of the first saddle 24, second saddle 25 and tool rest 26 is controlled not to exceed the speed limit by checking whether nor not the three-dimensional modeling data of the first saddle 24, second saddle 25, tool rest 26 and tool T moves within the speed control regions A, B, C for the spindle 22, chuck 23 and workpiece W, and whether or not the three-dimensional modeling data of the spindle 22, chuck 23 and workpiece W moves relatively in the speed control regions A, B, C for the first saddle 24, second saddle 25, tool rest 26 and tool T.

In the example described above, a configuration in which the travel area checking unit 17 employs the move-to point, predicted by the move-to point predictor 16, of the first saddle 24, second saddle 25 and the tool rest 26, to generate the three-dimensional modeling data describing the first saddle 24, second saddle 25, and tool rest 26 that have moved is taken, but there is no limitation to the configuration, so another configuration in which the move-to point predictor 16 is omitted and the actual position of the first saddle 24, second saddle 25 and tool rest 26 is received from the position control unit 12 to generate, based on the actual position, the three-dimensional modeling data describing that the first saddle 24, second saddle 25 and tool rest 26 has moved may be taken.

Furthermore, the image data generator 18 is not configured to employ the move-to point, predicted by the move-to point predictor 16, of the first saddle 24, second saddle 25 and tool rest 26, to generate the three-dimensional modeling data describing them having moved, but may be configured to receive from the position control unit 12 the actual position of the first saddle 24, second saddle 25 and tool rest 26 to generate, based on the received actual position, the three-dimensional data describing the first saddle 24, second saddle 25 and tool rest 26 having moved, to generate the three-dimensional modeling data by using the move-to point, predicted by the move-to point predicting device 16, of the first saddle 24, second saddle 25 and tool rest 26. In addition, the image data generated by the image data generator 18 is one example, but there is no limitation to the configuration.

In this embodiment, the controller 1 is provided with the programmable controller 11, but may be configured so that this programmable controller 11 is omitted. In such a configuration, the manipulate signal from the operation keys 33 and the manual pulse generator 34 is directly inputted to the position control unit 12, and the feed mechanisms 27, 28, 29 are controlled by the position control unit 12, based on the inputted manipulate signal.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A controller provided in a machine tool furnished with at least one moving body, with a drive mechanism for driving the moving body to move it, and with at least one structure provided within a movement region of the moving body, the machine tool controller comprising:

a position control unit for receiving an operational signal, externally input through the agency of a manual operation, involving a move-to point and moving speed of the moving body, and for controlling, based on the received operational signal, actuation of the drive mechanism to control moving of the moving body so as to have a move-to point and moving speed accorded with the operational signal;

a modeling data memory for storing modeling data relating to two-dimensional or three-dimensional models of, and including at least geometry data defining shapes of, the moving body and structure;

a speed limit data memory for storing one or more speed limits of the moving body within one or more speed control regions which are obtained by displacing outwards the contour of one or both of the moving body and structure, said one or more speed limits being defined for each of said speed control regions, and said one or more speed limits being each lower than the speed limit of the moving body outside its corresponding speed control region in the displacement direction; and a travel area checking unit for defining, in the two-dimensional or three-dimensional model of one or both the moving body and structure, the one or more speed control regions, and for executing a process of receiving from said position control unit current position of the moving body, and generating, based on the defined speed control regions, on the received current position, and on the modeling data stored in said modeling data memory, data modeling said moving body having been moved into the current position, to check whether the moving body and the structure will move relative to each other within the speed control regions, and a process of recognizing, when having determined that there will be movement within said speed control regions, the speed control region in which the movement will be, and of recognizing the speed limit, stored in the speed limit data memory, corresponding to the recognized speed control region, and sending the recognized speed limit to said position control unit; wherein the position control unit is configured to move the moving body at the received speed limit when the moving speed in accordance with the operational signal exceeds the speed limit received from the travel area checking unit.

2. A machine tool controller as set forth in claim 1, further comprising a move-to point predictor for receiving from said position control unit the current position of, and current speed of, the moving body to predict, from received said current position and speed, the move-to point into which the moving body moves after a predetermined time period, wherein:

said travel area checking unit is configured to arrange said one or more speed control regions for the two-dimensional or three-dimensional model of one or both of the moving body and structure, and generate, based on arranged said speed control regions, on said move-to point predicted by said move-to point predictor, and on said modeling data stored in said modeling data memory, modeling data describing the moving body moved into the predicted move-to point to execute the process of checking whether or not the moving body and structure move relatively in said speed control regions, and when having determined that the moving body and structure move relatively in said speed control regions, recognize in which said speed control region they move, and recognize said speed limit data memory-storing speed limit corresponding to recognized said speed control region, to execute the process of sending the recognized speed limit to said position control unit.

3. A machine tool controller as set forth in claim 2, said machine tool controller being provided in the machine tool further furnished with a screen display device for displaying image data, and therein further comprising:

an image data generator for generating, based on the move-to point predicted by said move-to point predictor and on the modeling data stored in said modeling data memory, the modeling data describing the moving body moved into predicted said move-to point, and for producing the two-dimensional and three-dimensional image data that depends on the generated modeling data to display said image data on a screen of said screen display device.

4. A machine tool controller as set forth in claim 3, wherein:

said travel area checking unit is configured to check, based on generated said modeling data, whether or not the moving body and structure interfere with each other, and when determining that they do so, to execute an process of sending a stop signal to said position control unit, in addition to said other processes; and said position control unit is configured to receive said stop signal from travel area checking unit to halt moving of the moving body.

5. A machine tool controller as set forth in claim 2, wherein:

said travel area checking unit is configured to check, based on generated said modeling data, whether or not the moving body and structure interfere with each other, and when determining that they do so, to execute an process of sending a stop signal to said position control unit, in addition to said other processes; and said position control unit is configured to receive said stop signal from travel area checking unit to halt moving of the moving body.

6. A machine tool controller as set forth in claim 1, said machine tool controller being provided in the machine tool further furnished with a screen display device for displaying image data, and therein further comprising:

an image data generator for receiving from said position control unit said current position of the moving body to generate, based on received said current position and on the modeling data stored in said modeling data memory, the modeling data describing the moving body moved into said current position, and for producing the two-dimensional or three-dimensional image data that depends on generated said modeling data to display said image data on a screen of said screen display device.

7. A machine tool controller as set forth in claim 6, wherein:

said travel area checking unit is configured to check, based on generated said modeling data, whether or not the moving body and structure interfere with each other, and when determining that they do so, to execute an process of sending a stop signal to said position control unit, in addition to said other processes; and said position control unit is configured to receive said stop signal from travel area checking unit to halt moving of the moving body.

8. A machine tool controller as set forth in claim 1, wherein:

said travel area checking unit is configured to check, based on generated said modeling data, whether or not the moving body and structure interfere with each other, and when determining that they do so, to execute an process of sending a stop signal to said position control unit, in addition to said other processes; and said position control unit is configured to receive said stop signal from travel area checking unit to halt moving of the moving body.

\* \* \* \* \*